Feb. 14, 1961 M. J. DEWEY 2,971,530
HIGH-LOW PRESSURE CONTROL MEANS FOR FLUID SUPPLY SYSTEMS
Filed March 18, 1957 3 Sheets-Sheet 1

INVENTOR.
MAURICE J. DEWEY
BY
*Whittemore Hulbert & Belknap*
ATTORNEYS

Feb. 14, 1961 M. J. DEWEY 2,971,530
HIGH-LOW PRESSURE CONTROL MEANS FOR FLUID SUPPLY SYSTEMS
Filed March 18, 1957 3 Sheets-Sheet 2
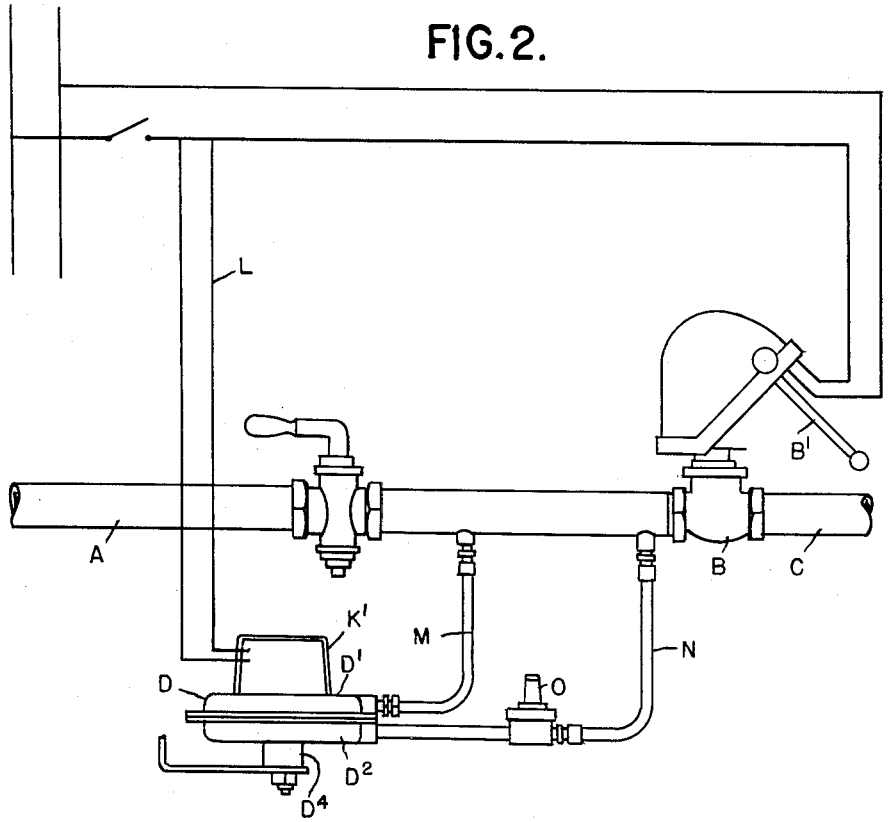
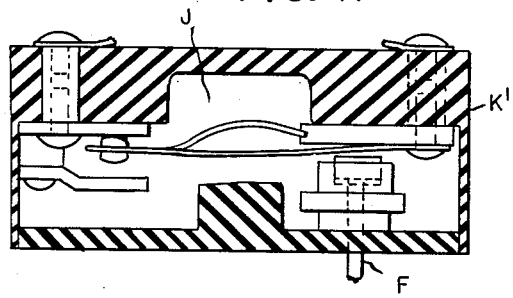
INVENTOR.
MAURICE J. DEWEY
BY
*Whittemore Hulbert & Belknap*
ATTORNEYS

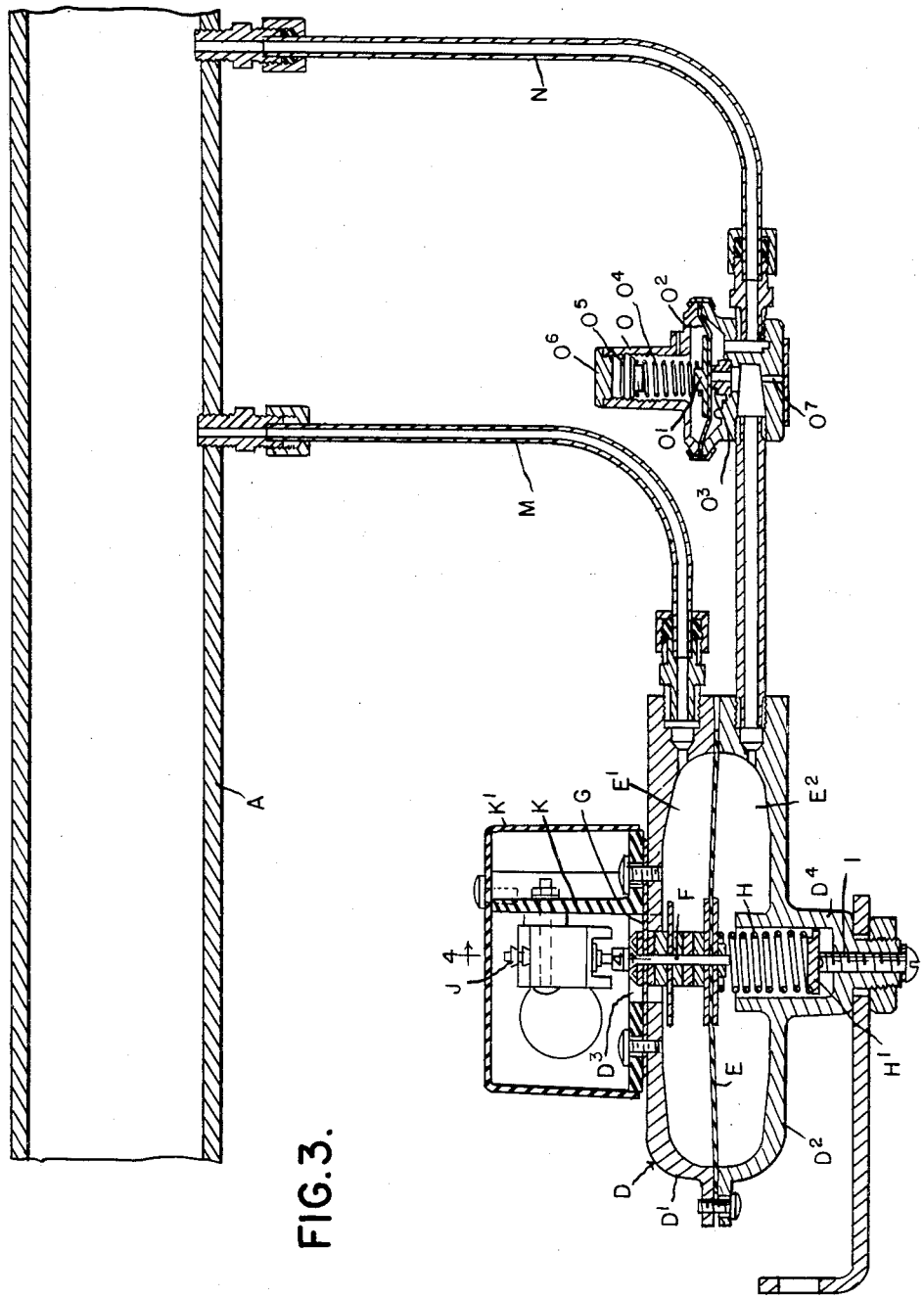

United States Patent Office 2,971,530
Patented Feb. 14, 1961

2,971,530

HIGH-LOW PRESSURE CONTROL MEANS FOR FLUID SUPPLY SYSTEMS

Maurice J. Dewey, 34036 E. Jefferson, St. Clair Shores, Mich.; Katherine Dewey, executrix of the estate of said Maurice J. Dewey, deceased Filed Mar. 18, 1957, Ser. No. 646,723

5 Claims. (Cl. 137—458)

The invention relates to fluid supply systems, such for instance as a supply of fuel gas to a burner. For safety it is desirable that the pressure of the gas so supplied should not either rise above or fall below predetermined limits. Various constructions of automatic shut-off valves have heretofore been used for this purpose but these have required separate means responsive respectively to high and low pressures for operating the valve.

It is the object of the invention to obtain a simple unit construction responsive to either abnormally high or low pressures for operating the shut-off valve. To this end the invention consists in the construction as hereinafter set forth.

This application forms a continuation-in-part of my pending application Serial No. 275,803, filed March 10, 1952.

In the accompanying drawings:

Fig. 2 is an elevation illustrating a gas supply line for a burner, a shut-off valve therein and my improved control means for said valve.

Fig. 3 is a vertical longitudinal section through the control unit and its connections to the supply line.

Fig. 4 is a cross section on line 4—4, Fig. 3.

Figure 1:
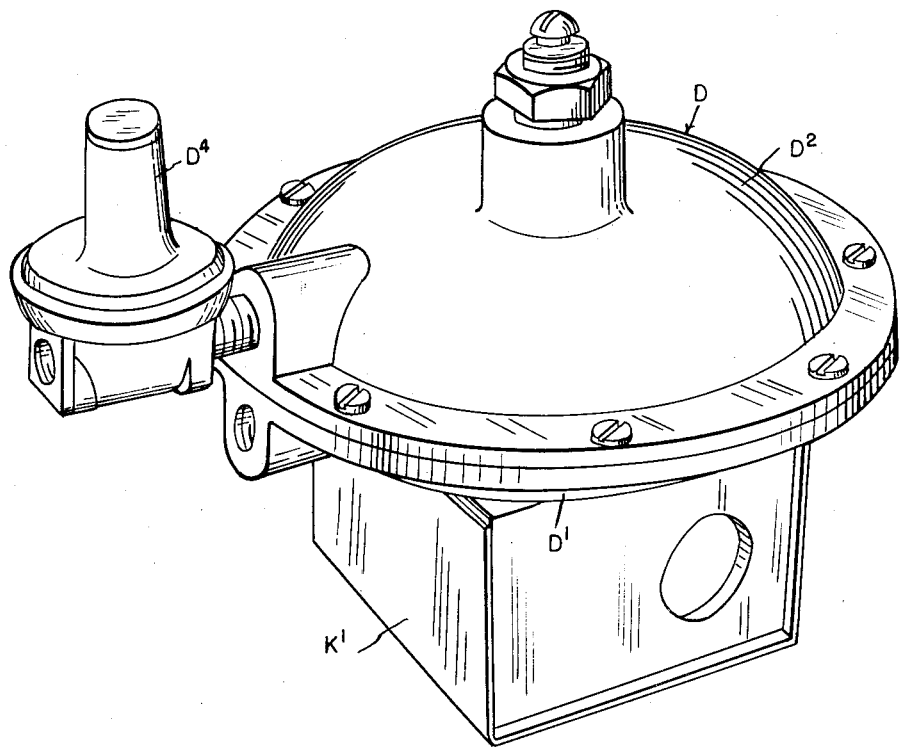
Fig. 1 is a perspective view of the control unit.

As shown in Fig. 2, A is the gas supply line which contains an automatic shut-off valve B between the same and the conduit C leading to the burner. The specific construction of the valve B is not my invention and may be varied. However, it includes a manually operable lever B' for opening the valve and electrical means (not completely illustrated) for preventing such opening or the retaining of the valve open, excepting under a predetermined condition of a controlling electric circuit. Preferably the electric circuit must be closed to permit opening of the valve by the lever B' and must also remain closed to retain the valve in open position. It is obvious however that the construction might be one in which the circuit must be open under such conditions of the valve.

The control unit includes a casing D, preferably formed in two chambered parts D' and $D^2$, with a flexible diaphragm E clamped therebetween and sealing between the chambers thereof. The member D' has a central aperture $D^3$ in the wall thereof for the passage outward therethrough of a rod F secured at its inner end to the diaphragm E. There is also a second smaller flexible diaphragm G secured to this rod and sealing the passage $D^3$ while permitting a limited movement of the rod and diaphragms. This will form a gas tight chamber within said member D'. The member $D^2$ has centrally thereof a hollow hub portion $D^4$ for receiving a coil spring H bearing against the diaphragm E. An abutment H' for the spring H is adjustable in position by a screw I in said hub and operable from outside thereof. Thus, by adjusting the screw I any desired degree of resilient pressure may be applied to the diaphragm E for deflection of the same. Outside the casing D there is mounted thereon an electric circuit closing switch J, preferably a microswitch. This mounting may include a post K on which the switch J is variably positioned to be operated by the rod F. A housing K' attached to the post K incloses and protects the switch. L is an electric circuit, including the switch J and leading to the valve B. M and N are conduit connections between the supply line A and the chambers E' and $E^2$ on opposite sides of the diaphragm E. The conduit M is open but the conduit N includes a valve O normally closed, adapted to be opened by line pressure in excess of a predetermined high limit. As shown the valve O has a closure member O' secured to a diaphragm $O^2$ and pressed against a seat $O^3$ by a spring $O^4$. This spring may be variably loaded by adjustment of an abutment $O^5$ engaging an internally threaded portion of the valve casing and accessible for adjustment by removal of a cap $O^6$. Thus the valve may be set to be opened by any desired fluid pressure and to remain closed under lower pressures.

With the construction as described the pressure of the fluid within the supply conduit A will at all times be communicated to the chamber E', where by pressing against the diaphragm E, it will oppose movement thereof under the actuation of the spring H. The screw I may be set to load the spring H so that with any line pressure less than a predetermined limit it will deflect the diaphragm sufficiently to operate the switch J. This will deenergize the circuit L to effect the closing of the valve B. The specific construction of electrical and mechanical means by which the valve closure is effected is not my invention and, therefore, is not illustrated. It will be sufficient to say that the valve B will automatically close when the circuit L is deenergized and cannot be manually opened until current in said circuit is restored.

In case line pressure rises above a predetermined high limit, then pressure within the conduit N will open the valve O, permitting fluid pressure to enter the chamber $E^2$ acting upon the diaphragm E in opposition to the fluid pressure in the chamber E'. This will substantially equalize fluid pressures on opposite sides of the diaphragm E, permitting deflection thereof by the spring H sufficient to operate the switch. To permit restoration of atmospheric pressure within the chamber $E^2$, when the valve O is closed, a bleed port $O^7$ is provided, preferably in the valve O.

What I claim as my invention is:

1. Automatic gas controlling means responsive to gas pressures in a supply line, either higher or lower than predetermined limits, comprising a casing, a flexible diaphragm dividing said casing into two chambers sealed from each other, a rod centrally connected to said diaphragm having one end passing out from said casing through an aperture therein, sealing means between said casing and said portion of the rod preventing communication from said casing through said aperture, an electric switch operatively connected to the outer end of said rod, separate conduits respeectively connecting said chambers with said gas supply line, each conduit being connected at the periphery of the chamber at a point remote from the central zone thereof, said casing being otherwise closed thereby subjecting the chambers on opposite sides of said diaphragm to only those pressures which are derived from said conduits, one conduit being in continuous communication, a normally closed valve in the other conduit, means other than gas pressures within said chambers for biasing said diaphragm to move in opposition to gas pressure in the chamber connected to said open conduit if less than the low limit, and means for opening said valve by gas pressure in the conduit having said valve when the gas pressure therein is above the high limit, whereby gas pressures on opposite sides of said diaphragm are equalized, permitting said biasing means to operate said controlling means.

2. The construction as in claim 1 having a bleed port for the chamber connected to the valved conduit for dissipating the pressure therefrom when the valve is closed.

3. The construction as in claim 1 in which said biasing means is a spring bearing against said diaphragm in the chamber connected to the valved conduit and an abutment for said spring also in said chamber adjustable from outside the casing.

4. The construction as in claim 3 having a small diaphragm exposed to gas pressure within said valved conduit and connected to open the valve and a spring opposing valve opening adjustable to yield at variable pressures.

5. Apparatus for automatically closing a gas supply line when the pressure is either higher or lower than certain predetermined limits, comprising a casing, a flexible diaphragm dividing said casing into two chambers sealed from each other, a rod centrally connected to said diaphragm having one end passing out from said casing through an aperture therein, sealing means in one chamber between said casing and said portion of the rod preventing communication from said chamber through said aperture, an electric switch operatively connected to the outer end of said rod, a spring in the other chamber bearing against said diaphragm biasing the same to move said rod outwardly from said casing, an abutment for said spring adjustable from without said casing to variably load said spring, fluid connections from each of said chambers located at points remote from the central zone of said casing, said casing being otherwise closed thereby subjecting the chambers on opposite sides of said diaphragm to only those pressures which are derived from said fluid connections, a conduit connecting each of said fluid connections to said gas supply line, one conduit being in continuous communication and the other being in communication through a valve mechanism remote from said casing, a spring-closed valve in said valve mechanism, a bleed port in said valve mechanism in open communication with a chamber in said casing when said valve is closed, and means for opening said valve by gas pressure opposing said spring when the gas pressure is above the high limit, whereby gas pressures on opposite sides of said diaphragm are equalized, permitting the spring in said casing to actuate said diaphragm and operate said electric switch.

References Cited in the file of this patent

UNITED STATES PATENTS

| | | |
|---|---|---|
| 819,492 | Wylie | May 1, 1906 |
| 1,055,803 | Runnion | Mar. 11, 1913 |
| 2,096,671 | De Motte | Oct. 19, 1937 |
| 2,192,630 | Beam | Mar. 5, 1940 |
| 2,229,740 | Helmore | Jan. 28, 1941 |
| 2,320,508 | Burns | June 1, 1943 |
| 2,620,820 | Born | Dec. 9, 1952 |
| 2,637,331 | Sullivan | May 5, 1953 |
| 2,701,580 | Sullivan | Feb. 8, 1955 |

FOREIGN PATENTS

| | | |
|---|---|---|
| 490,699 | Germany | Jan. 31, 1930 |